United States Patent
Du et al.

(10) Patent No.: US 9,485,674 B2
(45) Date of Patent: *Nov. 1, 2016

(54) METHOD AND SYSTEM FOR UNIFIED RATE ADAPTATION FOR SU-BF AND MU-MIMO OPERATION

(71) Applicant: QUALCOMM Incorporated, San Diego, CA (US)

(72) Inventors: Shu Du, Milpitas, CA (US); Zhanfeng Jia, Belmont, CA (US); Ning Zhang, Saratoga, CA (US); Guido R. Frederiks, Watsonville, CA (US); Vincent K. Jones, Redwood City, CA (US); Qinghai Gao, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/074,905

(22) Filed: Mar. 18, 2016

(65) Prior Publication Data
US 2016/0204897 A1    Jul. 14, 2016

Related U.S. Application Data

(63) Continuation of application No. 13/707,511, filed on Dec. 6, 2012, now Pat. No. 9,363,686.

(51) Int. Cl.
*H04L 1/00* (2006.01)
*H04W 24/02* (2009.01)
(Continued)

(52) U.S. Cl.
CPC .......... *H04W 24/02* (2013.01); *H04B 7/0452* (2013.01); *H04B 7/0617* (2013.01); *H04J 9/00* (2013.01); *H04L 1/0003* (2013.01);
(Continued)

(58) Field of Classification Search
CPC ....................................................... H04J 9/00
See application file for complete search history.

(56) References Cited

U.S. PATENT DOCUMENTS

| 8,111,662 B2 | 2/2012 | Lee et al. |
| 2006/0160556 A1 | 7/2006 | Mueller et al. |

(Continued)

FOREIGN PATENT DOCUMENTS

| EP | 2139138 A1 | 12/2009 |
| JP | 2007151056 A | 6/2007 |

(Continued)

OTHER PUBLICATIONS

IEEE 802.11ac Draft 2.1 "Wireless LAN Medium Access Control (MAC) and Physical Layer (PHY) specifications", Mar. 2012, pp. 1-363, Institute of Electrical and Electronics Engineers.

(Continued)

*Primary Examiner* — John Blanton
(74) *Attorney, Agent, or Firm* — Holland & Hart LLP

(57) ABSTRACT

A method of providing rate adaptation in a multi-user wireless communication system including single-user beamforming (SU-BF) and multi-user multiple-input multiple-output (MU-MIMO) is described. In this method, a master rate, which is a modulation and coding scheme (MCS) for the SU-BF, is determined. An MCS for each transmit mode is derived from the master rate using a rate mapping. Using the results from the mapping, the master rate, instead of the MCS for each transmit mode, is tracked. In one embodiment, a mapping calibration is periodically performed.

30 Claims, 4 Drawing Sheets

(51) Int. Cl.
*H04J 9/00* (2006.01)
*H04W 28/06* (2009.01)
*H04B 7/04* (2006.01)
*H04B 7/06* (2006.01)
*H04L 1/06* (2006.01)
*H04L 1/20* (2006.01)

(52) U.S. Cl.
CPC .......... *H04L 1/0009* (2013.01); *H04L 1/0019* (2013.01); *H04L 1/0026* (2013.01); *H04L 1/06* (2013.01); *H04W 28/06* (2013.01); *H04B 7/0626* (2013.01); *H04L 1/203* (2013.01)

(56) References Cited

U.S. PATENT DOCUMENTS

| | | |
|---|---|---|
| 2009/0116589 A1 | 5/2009 | Zhang et al. |
| 2009/0247180 A1 | 10/2009 | Higuchi et al. |
| 2009/0274226 A1 | 11/2009 | Mondal et al. |
| 2010/0166097 A1 | 7/2010 | Zhou et al. |
| 2011/0003608 A1 | 1/2011 | Forenza et al. |
| 2011/0064014 A1 | 3/2011 | Li et al. |
| 2011/0188428 A1 | 8/2011 | Ishii |
| 2012/0057585 A1 | 3/2012 | Sayana et al. |
| 2012/0218982 A1 | 8/2012 | Lee et al. |
| 2012/0236817 A1 | 9/2012 | Chen et al. |
| 2012/0250742 A1* | 10/2012 | Tiirola .............. H04L 25/03343 375/219 |
| 2012/0257606 A1 | 10/2012 | Sampath et al. |
| 2012/0320862 A1 | 12/2012 | Ko et al. |
| 2013/0028309 A1 | 1/2013 | Park et al. |
| 2014/0160947 A1* | 6/2014 | Du ....................... H04B 7/0452 370/252 |
| 2014/0369283 A1* | 12/2014 | Ge ....................... H04B 7/0452 370/329 |

FOREIGN PATENT DOCUMENTS

| | | |
|---|---|---|
| WO | WO-2011122830 A2 | 10/2011 |
| WO | WO-2014088595 A1 | 6/2014 |

OTHER PUBLICATIONS

ISA/EPO, International Search Report and the Written Opinion of the International Searching Authority, Int'l App. No. PCT/US2012/068538, Jul. 25, 2013, European Patent Office, Rijswijk, NL 14 pgs.

Sony Corporation, "CQI Enhancement for MU-MIMO," 3GPP TSG-RAN WG1#63, R1-105854, Jacksonville, USA, 15-19, Nov. 2010, 6 pgs, 3rd Generation Partnership Project.

* cited by examiner

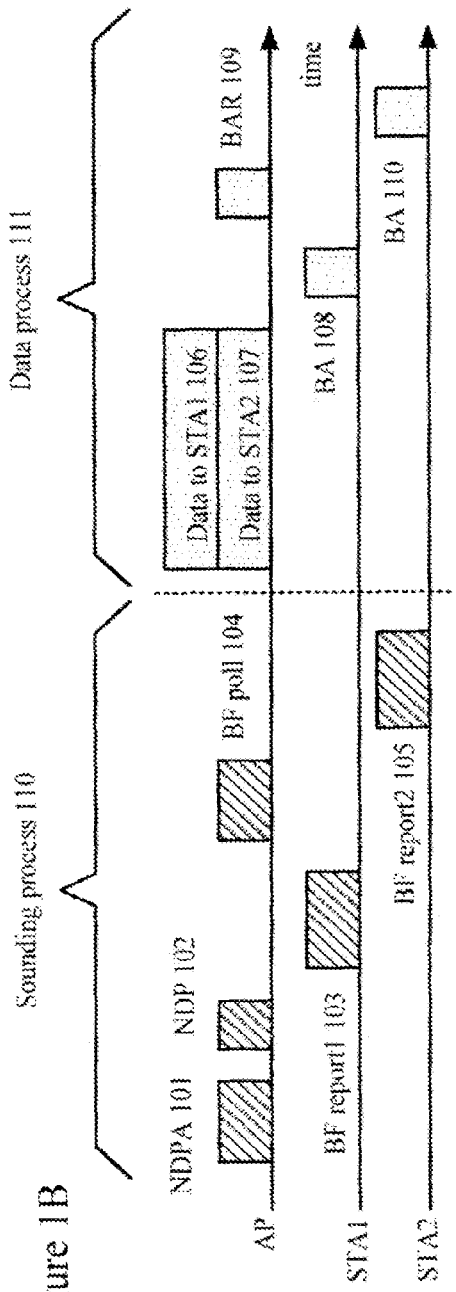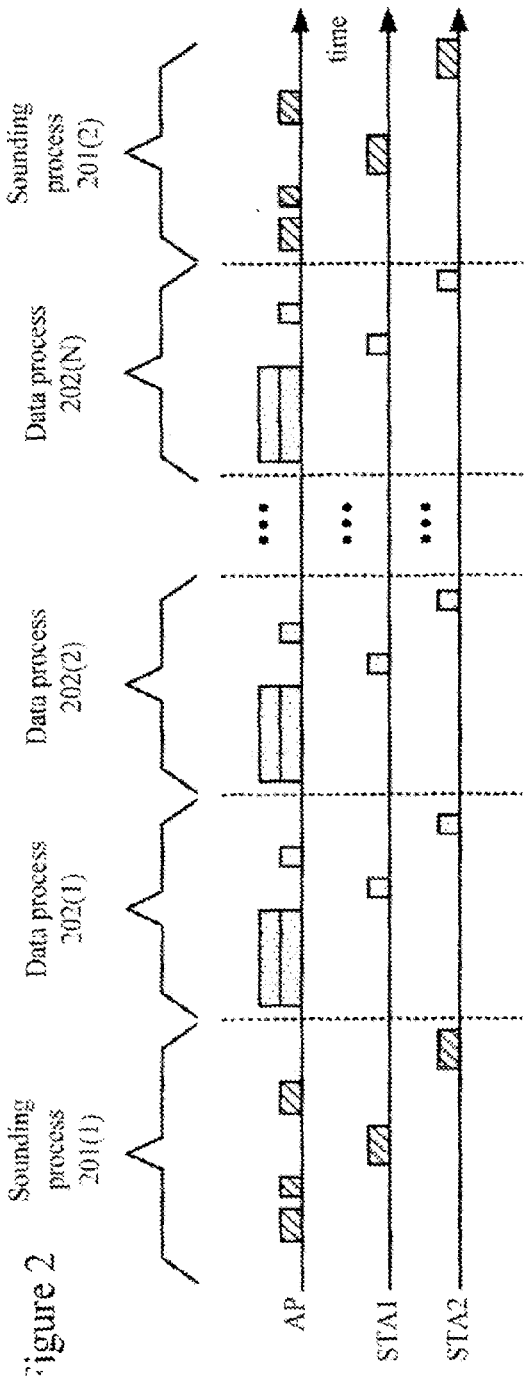

METHOD AND SYSTEM FOR UNIFIED RATE ADAPTATION FOR SU-BF AND MU-MIMO OPERATION

CROSS REFERENCES

The present Application for Patent is a continuation of U.S. patent application Ser. No. 13/707,511 by Du et al., entitled "Method and System for Unified Rate Adaptation for SU-BF and MU-MIMO Operation," filed Dec. 6, 2012, assigned to the assignee hereof, and expressly incorporated by reference herein.

BACKGROUND

1. Field of the Disclosure

The invention relates generally to transmission rate adaptation, and in particular to unified rate adaptation in multi-user Wi-Fi® systems.

2. Description of Related Art

IEEE 802.11 refers to a set of standards for implementing wireless local area network (WLAN) communication in the, e.g., 2.4, 3.6, and 5 GHz frequency bands. WLAN communication allows a device to exchange data wirelessly with one or more other devices. Wi-Fi is a brand name for WLAN products using any of the IEEE 802.11 standards.

IEEE 802.11ac is a new standard being developed to support Very High Throughput (VHT) operations in the 5 GHz frequency band. To obtain this VHT operation, an 802.11ac device uses a wide RF (radio frequency) bandwidth, up to 8 spatial streams using multiple antennas at both the transmitter and receiver {called multiple-input multiple-output or MIMO in the wireless industry), thereby allowing a terminal to transmit or receive signals to/from multiple users in the same frequency band simultaneously. VHT operation also uses a high-density modulation of up to 256 QAM (quadrature amplitude modulation).

Beamforming is a technique using directional signal transmission or reception with multiple antennas to achieve spatial selectivity. For example, a transmitter can control the phase and amplitude of the signals at each antenna to create a pattern of constructive and destructive interference in the wavefront.

To correctly form a beam for MIMO communication, the transmitter needs to know the characteristics of the channel. To obtain these channel characteristics, the transmitter can send a known signal to a device, which allows that device to generate information regarding the current quality of the channel. The device can then send this channel state information (CSI) back to the transmitter, which in turn can apply the correct phases and amplitudes to form the optimized beam directed at the device. This process is called channel sounding or channel estimation (referenced as the sounding process herein).

In 802.11ac communication, an access point (AP) can use the sounding process to collect CSI from one or more potential destination stations. Thereafter, the AP can use the collected CSI as the current channel estimation to send downlink data to multiple stations in a multi-user MIMO (MU-MIMO) frame. Note also that the collected CSI can be used to send downlink data to one station in a SU-MIMO frame, wherein SU-MIMO is a single-user MIMO (a beamforming technique using multiple antennas at one station).

When the SU-BF or MU-MIMO data is sent out immediately after a sounding process (e.g., 1-10 ms), the CSI information used for SU-BF/MU-MIMO data transmission is fresh, and the packet will have a higher chance to be delivered successfully. On the other hand, if the SU-BF/MU-MIMO data is sent out even a brief time after the last sounding process, the CSI information used in generating single-user beamforming (SU-BF) or MU-MIMO data transmission can be STA1e and the packet may have a lower chance of being delivered successfully.

Traditional rate adaptation algorithms in single-user (SU) Wi-Fi systems select a new rate based on the recent history of transmission successes or failures. If sounding has been recent, then the packet is typically delivered successfully using the appropriate modulation and coding scheme (MCS) based on the CSI of the sounding, and the sender will try to probe a higher MCS next time. In contrast, if a packet is delivered with a high packet error rate (PER) using a specific MCS, then the sender will try to lower the MCS to increase the chance that future packets will be delivered successfully.

The process of selecting an appropriate MCS for given channel conditions is referred to as rate adaptation. Performing rate adaptation in MU Wi-Fi systems is not straight forward. Specifically, the rate adaptation algorithm may be requested to provide SU-OP (Single-User Open loop, aka, non-beamforming), SU-BF, or MU-MIMO rates to a destination node. Eliminating the option of SU-OP does not simplify the problem because a rate adaptation still needs to select the best MCS for both SU-BF and MU-MIMO transmission despite the fact that the best rate for each can differ markedly.

Depending upon channel condition or MU-MIMO level (2-user or 3-user), SINR (signal to interference noise ratio) of 3-user MU-MIMO 1 2-user MU-MIMO, and SU-BF transmissions can differ substantially, even if the CSI information has the same age.

The situation gets even more complicated in that, under different channel conditions, for example, with Doppler and without Doppler, the SINR gaps among 3-user MU, 2-user MU, and SU-BF can be markedly different as well. These variations make rate selection even more difficult.

One straightforward way to perform rate adaption for MU-MIMO systems is to track the best MCS separately for different transmit (TX) modes. Under such a scheme, transmission history of SU-BF, 2-user MU-MIMO, and 3-user MU-MIMO will be tracked independently from each other and each of them will perform as described in the traditional rate adaption algorithm. However, doing this will significantly increase the memory requirement and complexity of the algorithm. Another drawback is that at some specific duration, the sender may use the same TX mode to the destination, so the rate of that specific TX mode can be tracked well. However, when switching to a different TX mode, the sender has to take a predetermined period to determine the best MCS of the new TX mode.

Therefore, what is needed is a rate adaptation method having improved computational cost for use in MU WLAN systems, including Wi-Fi systems.

SUMMARY

A method of providing rate adaptation in a multi-user wireless communication system including single-user beamforming (SU-BF) and multi-user multiple-input multiple-output (MU-MIMO) is provided. In this method, a master rate, which is a modulation and coding scheme (MCS) for the SU-BF, is determined. An MCS for each transmit mode is derived from the master rate using a rate mapping function. Using the results from the mapping, the master rate, instead of the MCS for each transmit mode, is tracked, thereby reducing the computational cost of tracking a separate MCS for each transmit mode. In another embodiment, a mapping calibration is periodically performed to insure the continued validity of the rate mapping function.

A computer-readable media storing computer instructions that when executed carry out the described rate adaptation method is provided. A wireless communication system including a programmable platform for carrying out the described rate adaptation method is also provided.

BRIEF DESCRIPTION OF THE DRAWINGS

FIG. 1B illustrates an exemplary communication timing diagram between the AP and the stations STA1 and STA2 shown in FIG. 1A, including a sounding process for establishing current communication channel quality.

FIG. 2 illustrates a timing diagram, between the AP and the stations STA1 and STA2 shown in FIG. 1A, including a first sounding process followed by a plurality of data processes and a second sounding process.

DETAILED DESCRIPTION

What is described below are embodiments for systems and methods for rate adaptation including, but not limited to, improved computational cost for use in MU WLAN systems, including Wi-Fi systems. For WLAN systems, and especially MU Wi-Fi systems, a unified rate adaptation algorithm can advantageously track the best noticed rates of different TX modes (e.g., SU-BF, SU-MIMO, MU-MIMO, etc.) concurrently, thereby saving significant overhead of memory and computing, as well as providing more accurate and timely MCS suggestions compared to separate TX mode tracking.

Figure 1A:
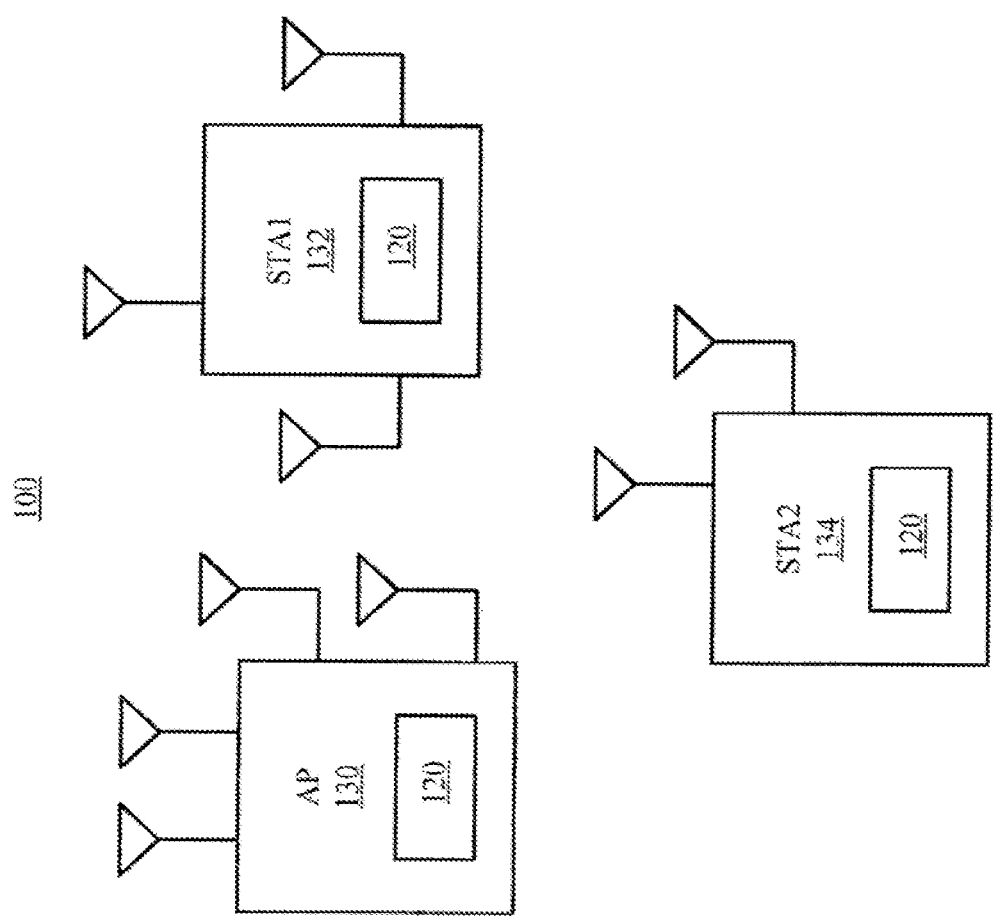
FIG. 1A illustrates an example basic service set (BSS) including an AP and two stations, STA1 and STA2.

FIG. 1A illustrates an example basic service set (BSS) 100 including an AP 130 and two stations STA1 132 and STA2 134. In one embodiment, each device 130, 132, and 134 includes a transceiver 120 (transmitter and receiver) configured for operation in accordance with a WLAN standard (e.g., the IEEE 802.11ac standard). FIG. 1A will be referred to in describing the following figures for illustration. However, limitations should not be placed on embodiments of the disclosure based on the illustration of the BSS 100. For example, BSS 100 may include more than two STAs (not illustrated for simplicity of describing embodiments of the disclosure). Additionally, the AP 130 may be a dedicated AP, soft-AP or otherwise a STA acting as an AP, etc. for the BSS 100. Furthermore, while two, three or four antennas are illustrated for each device, embodiments of the disclosure are not limited to specific numbers of antennas or specific numbers of transmit/receive chains for the devices.

FIG. 1B illustrates an exemplary communication timing diagram between the AP 130 and the stations STA1 132 and STA2 134 of FIG. 1A. The communication illustrated in FIG. 1B includes two processes: a sounding process 110 and a data process 111. Sounding process 110 begins with the AP 130 sending a null data packet announcement (NDPA) signal 101 to stations STA1 132 and STA2 134, wherein the NDPA signal 101 indicates that no data will be sent in the subsequent packet. Following the NDPA signal 101, the AP 130 sends a null data packet (NDP) signal 102. This NDP signal 102 can serve as a known signal for obtaining channel characteristics from the stations STA1 132 and STA2 134. After receipt of the NDP signal 102, station STA1 132 can send to the AP 130 its CSI in a beamforming (BF) report1 signal 103. In receiving the BF report1 signal 103, the AP 130 can send a BF poll signal 104 indicating that the station STA2 134 can send to the AP 130 its CSI. In response to receiving the BF poll signal 104, STA2 134 can send to the AP 130 its CSI in a BF report2 signal 105.

Using the CSI from its associated stations STA1 132 and STA2 134, the AP 130 can begin the data process 111 by concurrently sending MU-MIMO data 106 to STA1 132 and MU-MIMO data 107 to STA2 134. Note that although the term MU-MIMO is used to describe the data, the data may also be SU-MIMO in other embodiments. After receiving the data 106, the station STA1 132 can send to the AP 130 a block acknowledgement (BA) signal 108. Upon receiving the BA signal 108 from STA1 132, the AP 130 can send to STA2 134 a block acknowledgement request (BAR) signal 109. In response to receiving BAR signal 109, STA2 134 can send to the AP 130 its BA signal 110. Note that although FIG. 1A shows an AP associated with two stations, in other embodiments the AP can be associated with any number of stations, each of which can send a BF report signal during the sounding process 110 and a BA signal during the data process 111.

Because the sounding process has a large overhead in terms of medium airtime, the AP 130 can be configured not to do sounding prior to every MU-MIMO data transmission, as illustrated in the timing diagram of FIG. 2.

FIG. 2 illustrates a first sounding process 201(1) followed by a plurality of data processes 202(1)-202(N), wherein N is an integer greater than 1. After the N data processes are complete, a second sounding process 201(2) is performed before another plurality of data processes are performed (not shown).

A possible data rate for a transmission can be limited by the number of spatial streams used in the transmission, the modulation type, and the coding rate. Hence, the number of spatial streams, modulation type, coding rate, and resulting maximum data rates (or a portion of such information) may be included in a modulation and code scheme (MCS) for the STA. For example, the IEEE 802.11 family of standards defines various modulation and coding schemes, and represents them by index values. In one specific example regarding IEEE 802.11n (but which is applicable to other WLAN systems, e.g., 802.11ac), Table 1 below (taken from IEEE 802.11n) shows exemplary MCS index values and their respective spatial streams, modulation types, coding rates, and resulting maximum data rates. Note that data rates are provided for both 20 MHz and 40 MHz channels, as well as 800 ns and 400 ns guard intervals (Gis).

TABLE 1

| | | | | Data rate (Mbit/s) | | | |
| | | | | 20 MHz channel | | 40 MHz channel | |
| MCS | Spatial streams | Modulation rate | Coding rate | 800 ns GI | 400 ns GI | 800 ns GI | 400 ns GI |
| --- | --- | --- | --- | --- | --- | --- | --- |
| 0 | 1 | BPSK | 1/2 | 6.50 | 7.20 | 13.50 | 15.00 |
| 10 | 2 | QPSK | 3/4 | 39.00 | 43.30 | 81.00 | 90.00 |

TABLE 1-continued

| | | | | Data rate (Mbit/s) | | | |
|---|---|---|---|---|---|---|---|
| | | | | 20 MHz channel | | 40 MHz channel | |
| MCS | Spatial streams | Modulation rate | Coding rate | 800 ns GI | 400 ns GI | 800 ns GI | 400 ns GI |
| 19 | 3 | 16-QAM | 1/2 | 78.00 | 86.70 | 162.00 | 180.00 |
| 31 | 4 | 64-QAM | 5/6 | 260.00 | 288.80 | 540.00 | 600.00 |

The transmitter (e.g., from transceiver 120 of AP 130) attempts to determine an acceptable MCS under which parameters to send the data frames. Using a higher MCS may increase for some receivers' failure to decode the data frames, thereby increasing the PER. However, using a lower MCS may cause inefficiency in medium usage and network congestion, thus slowing transmission speed. Therefore, choosing a proper MCS for data frame transmissions is a tradeoff between reliability and speed in order to find an acceptable compromise.

Figure 3:
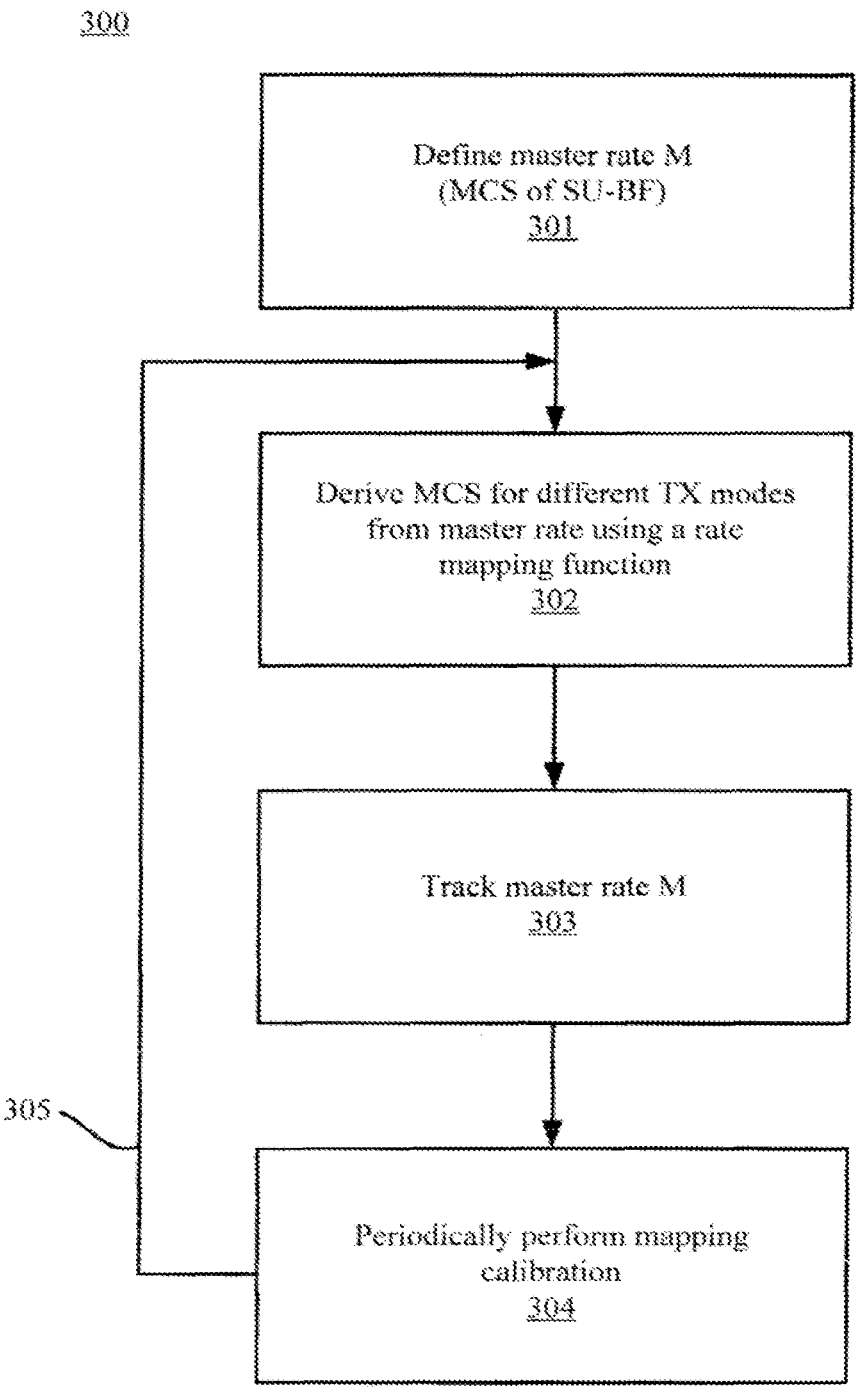
FIG. 3 illustrates an exemplary unified rate adaptation method for determining and periodically adjusting a modulation and coding scheme (MCS) for a communication system, such as the communication system illustrated in FIG. 1A.

FIG. 3 illustrates an exemplary unified rate adaptation method 300 for determining and periodically adjusting a modulation and coding scheme (MCS) for a communication system, such as the communication system illustrated in FIG. 1. At step 301, a master rate M is defined. In one preferred embodiment, the master rate M is the currently suggested MCS for SU-BF, for example: 1SS MCS9.

At step 302, the MCS for different TX modes can be derived from a master rate using a rate mapping function. At any given time, the recommended MCS for different TX modes can be directly derived from the master rate M using a rate mapping. One example of a rate mapping is a rate mapping function (f), and thus the master rate M can be derived using the inverse of the function (f'). The rate mapping function $f$ from the master rate to the suggested rate of different TX modes takes into account other input parameters, such as channel conditions, time elapsed since last valid sounding, and the like. In some embodiments, the parameters in the rate mapping function $f$ are contained in a lookup table, the contents of which are derived from offline simulations. Alternatively, the lookup table is derived through online calibration as described in step 304. For example, the rate mapping function time boundary values are learned from the past transmissions' PER history about the appropriate values of T2 and T3 that determine the MCS drop by 1 if using a 2-user MU-MIMO. For example, if in the past 2-user MU-MIMO transmissions, when using M−1, PER is smaller than 10% between 10 ms and 40 ms after sounding, the lookup table can be updated so that T2 is extended to 10 ms and T3 is extended to 40 ms.

An example of the rate mapping function to derive the suggested rate of a specific TX mode is given as the following:

$$MCS_{mode} = f(\text{mode}, d, \ldots) = \begin{cases} M, & \text{if mode SU\_BF, or } d < T1; \\ \max(0, M-1) & \text{if (mode} = 2UserMU \text{ and } T2 \leq d < T3), \\ & \text{or if (mode} = 3UserMU \text{ and } T4 \leq d < T5; \text{ and} \\ \max(0, M-2) & \text{if (mode} = 2UserMU \text{ and } T6 \leq d), \\ & \text{or if (mode} = 3UserMU \text{ and } T7 \leq d. \end{cases}$$

wherein variable d is the age of the last CSI data collected from sounding, and variable mode is a TX mode. Constants T1-T7 are expressed in ms, and represent boundary values for the CSI age variable d. In the exemplary rate mapping function $f$ the following boundary values are used: T1=T2=T4=5 ms, T3=T6=15 ms, and T5=T7=10 ms. Thus, in the exemplary function $f$, when the TX mode is SU-BF or the age d of the last CSI data is less than 5 ms, then MCS is set to the value of the master rate M. However, if the TX mode is 2UserMU and the age d of the last CSI data is between 5 ms and 15 ms, then MCS is set to the value of M−1. Similarly, if the TX mode is 3UserMU and the age d of the last CSI data is between 5 ms and 10 ms, then MCS is set to the value of M−1. If the TX mode is 2UserMU and the age d of the last CSI data is longer than 15 ms, then MCS is set to a value of M−2. Similarly, if the TX mode is 3UserMU and the age d of the last CSI data is longer than 10 ms, then MCS is set to a value of M−2. Note that in the event the value of MCS becomes negative, the negative value is replaced by 0, because negative values of MCS are not defined (see TABLE 1). Additionally, while the example function $f$ is defined for SU-BF, 2UserMU, and 3UserMU, a rate mapping function may include instances of greater user MUs, as may exist, e.g., in future standards.

At step 303, the master rate M is tracked, e.g., in the same way as the legacy rate adaptation algorithms based on PER. While illustrated in FIG. 3 as 303 being subsequent to 302, in one embodiment, the tracking occurs concurrently with the rate mapping of step 302 such that tracking is adjusting the value of the master rate M (since adjusting the value of M will also adjust the value for different transmit modes due to the mentioned rate mapping function). When the transmit mode changes, for whatever reason, the value of the master rate M may be reinitialized. For this purpose, the MCS rate used for the new transmit mode is used to compute its corresponding master rate of M using an inverse, $f'$, of the rate mapping function $f$. Typically, but not always, this new transmit mode is not the SU-BF mode. Therefore, in one embodiment, the used rate of the current transmit mode is transferred back to the master rate M using the inverse function $f'$. After converting to the master rate, if there is repeated success using the new TX mode, then the master rate M may be probed higher for a future transmission. On the other hand, if there is failure exceeding a specified threshold using the new transmit mode (e.g., more than 15% MPDUs are lost), then the master rate M may be lowered.

At step 304, the rate mapping function $f$ is checked (e.g., as described below) in fixed intervals of time. Since the rate mapping function only needs to be changed when the characteristics of the channel change, it does not need to happen frequently. An example of the fixed interval is 1 second. An example range of the interval can be 200 ms to 2 seconds. Alternatively, the rate mapping function $f$ is checked in variant intervals of time that are dynamically adapted based on the channel conditions) in order to determine if the function should be modified/calibrated. In some embodiments, rate mapping function calibration includes adjusting time boundary values expressed in the rate mapping function $f$. Examples of time boundary values are found in the above exemplary rate mapping function, e.g., in the expression "if (mode=2UserMU and T2≤d<T3)," where T2=5 ms, T3=15 ms, and T2, T3 are time boundary values.

The process of checking and calibrating ensures that the mapping between the master rate and the suggested rates remain valid. In one embodiment of checking, the sender intentionally sends back-to-back aggregate MAC protocol data units (AMPDUs) to the same destinations using different TX modes. If the collected PER estimation of those TX modes are within a specified range (e.g., within 10% of each other), the above-described rate mapping function ƒ is determined acceptable and will not be changed/calibrated. If the PERs of different modes are markedly different, the rate mapping function ƒ is adjusted accordingly. In one embodiment, if the function ƒ is adjusted, a check of the updated function ƒ is performed to determine if the adjustments are sufficient (e.g., the PER estimation of the TX modes using the AMPDUs are within the specified range) or if further adjustments are required. Operation continues, returning via path 305 to step 302.

Certain aspects of the rate adaptation method 300, as illustrated in FIG. 3, may take the form of an entirely software embodiment (including firmware, resident software, micro-code, etc.) or an embodiment combining software and hardware aspects that may all generally be referred to herein as a "circuit," "module" or "system." Furthermore, embodiments of the disclosure may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions (e.g., executable by one or more processing units). In addition, machine-readable signal medium embodiments may be embodied in an electrical, optical, acoustical, or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Although the rate control methods can be performed by an AP, an electronic device having wireless capability typically includes certain components that may or may not be characterized as part of an AP. Indeed, in some embodiments, certain components of the electronic device may be characterized as outside the AP, but still assist in one or more steps of the data scheduling technique.

Figure 4:
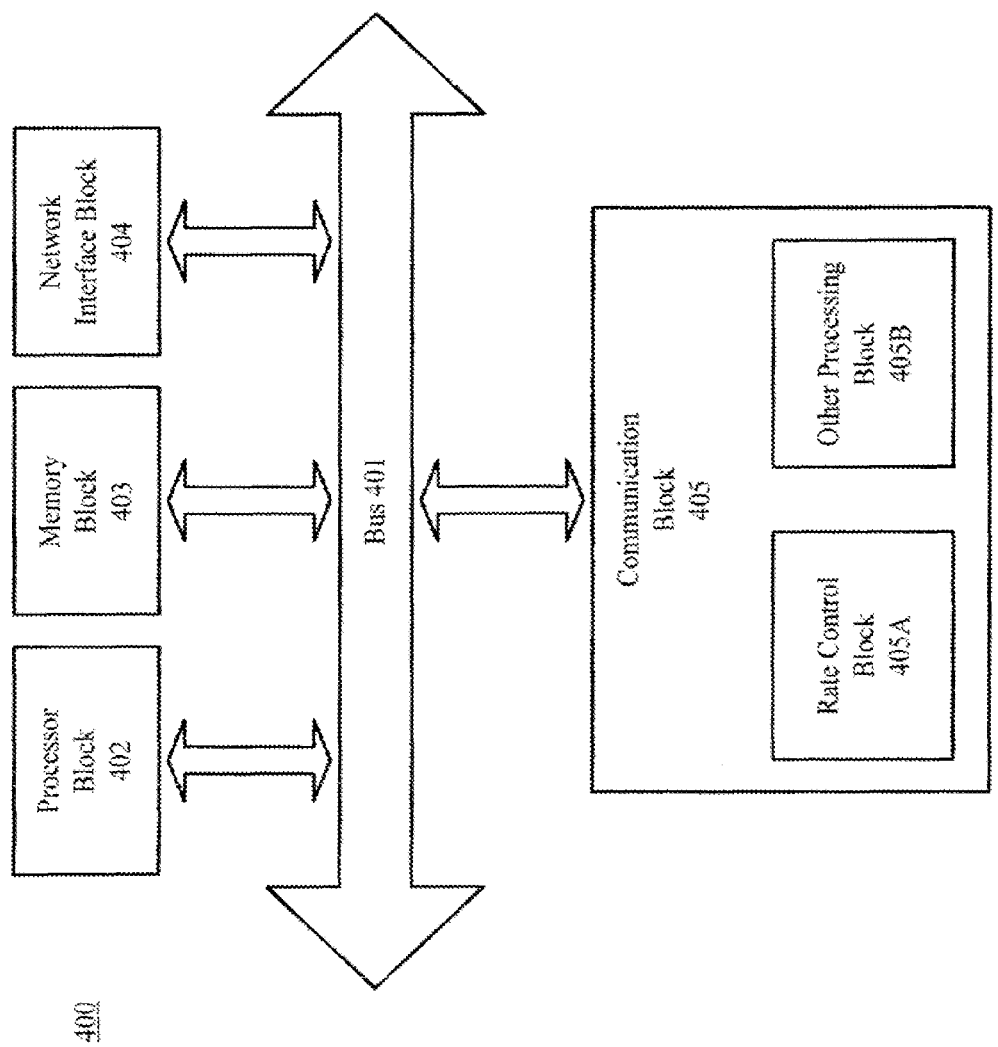
FIG. 4 illustrates a simplified electronic device including a rate control block that can perform the unified rate adaptation method shown in FIG. 3.

FIG. 4 illustrates a simplified electronic device 400 including a rate control block 405A, which can substantially perform the unified rate adaptation method 300. The electronic device 400 may be a notebook computer, a desktop computer, a tablet computer, a netbook, a mobile phone, a gaming console, a personal digital assistant (PDA), or other electronic system having wireless (and wired, in some cases) communication capabilities.

The electronic device 400 can include a processor block 402 (possibly including multiple processors, multiple cores, multiple nodes, and/or implementing multi-threading, etc.). The electronic device 400 can also include a memory block 403, which may include cache, SRAM, DRAM, zero capacitor RAM, Twin Transistor RAM, eDRAM, EDO RAM, DDR RAM, EEPROM, NRAM, RRAM, SONOS, PRAM, and/or another type of memory cell array. The electronic device 400 also includes a network interface block 404, which may include at least a WLAN 802.11 interface. Other network interfaces may include a Bluetooth interface, a WiMAX interface, a ZigBee® interface, a Wireless USB interface, and/or a wired network interface (such as an Ethernet interface, or a powerline communication interface, etc.). The processor block 402, the memory block 403, and the network interface block 404 are coupled to a bus 401, which may be implemented in accordance with PCI, ISA, PCI-Express, HyperTransport®, InfiniBand®, NuBus, AHB, AXI, or another bus standard.

The electronic device 400 also includes a communication block 405, which can include a rate control block 405A and another processing block 405B. The other processing block 405B may include, but is not limited to, portions of a transceiver for processing received signals, for processing to be transmitted signals, and for coordinating actions of the receiver and transmitter portions. Other embodiments may include fewer or additional components not illustrated in FIG. 4, such as video cards, audio cards, additional network interfaces, and/or peripheral devices. In one embodiment, the memory block 403 may be connected directly to the processor block 402 to increase system processing.

The above description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, although selecting a data rate is described in detail above, this selection can be characterized as also selecting an MCS (modulation and coding scheme) (see TABLE 1). Thus, the present invention is not intended to be limited to the embodiments shown herein but is to be accorded the widest scope consistent with the principles and novel features disclosed herein.

What is claimed is:

1. A method of adapting a rate of transmission at a wireless communication device, comprising:
    operating at a single user (SU) transmit mode of the wireless communication device, wherein the SU transmit mode uses a first modulation and coding scheme (MCS); and
    switching to a multi-user multiple input multiple output (MU-MIMO) transmit mode of the wireless communication device, wherein a second MCS is used for the MU-MIMO transmit mode based at least in part on the first MCS, the second MCS being less than the first MCS.

2. The method of claim 1, wherein the second MCS is further used for the MU-MIMO transmit mode based at least in part on an age of a most recent channel state information (CSI).

3. The method of claim 2, wherein the second MCS used for the MU-MIMO transmit mode is decremented from the MCS for the SU transmit mode by a number of steps, and wherein the number of steps is based at least in part on a predefined window of time associated with the age of the most recent CSI.

4. The method of claim 3, wherein different predefined windows of time are defined for MU-MIMO transmit modes associated with different numbers of users.

5. The method of claim 1, further comprising:
updating the MCS for the SU transmit mode based at least in part on an error rate for the SU transmit mode.

6. The method of claim 1, wherein the second MCS is used for the MU-MIMO transmit mode based at least in part on a rate mapping between the SU transmit mode and the MU-MIMO transmit mode.

7. The method of claim 6, wherein the rate mapping is based at least in part on a rate mapping function comprising time boundary values, the method further comprising:
updating the rate mapping by adjusting the time boundary values of the rate mapping function.

8. The method of claim 7, further comprising determining if the rate mapping is to be updated after an interval of time that is adapted based at least in part on channel conditions.

9. The method of claim 1, wherein a maximum MCS for the MU-MIMO transmit mode is based at least in part on a number of users associated with the MU-MIMO transmit mode.

10. A non-transitory, computer-readable medium storing computer-executable instructions for adapting a rate of transmission in a multi-user wireless communication system, the instructions when executed by a processor causing a wireless communication device to execute a process comprising:
operating at a single user (SU) transmit mode of the wireless communication device, wherein the SU transmit mode uses a first modulation and coding scheme (MCS); and
switching to a multi-user multiple input multiple output (MU-MIMO) transmit mode of the wireless communication device, wherein a second MCS is used for the MU-MIMO transmit mode based at least in part on the first MCS, the second MCS being less than the first MCS for the SU transmit mode.

11. The computer-readable medium of claim 10, wherein the second MCS is further used for the MU-MIMO transmit mode based at least in part on an age of a most recent channel state information (CSI).

12. The computer-readable medium of claim 11, wherein the second MCS used for the MU-MIMO transmit mode is decremented from the MCS for the SU transmit mode by a number of steps, and wherein the number of steps is based at least in part on a predefined window of time associated with the age of the most recent CSI.

13. The computer-readable medium of claim 12, wherein different predefined windows of time are defined for MU-MIMO transmit modes associated with different numbers of users.

14. The computer-readable medium of claim 10, wherein the process executed by the wireless communication device further comprises:
updating the MCS for the SU transmit mode based at least in part on an error rate for the SU transmit mode.

15. The computer-readable medium of claim 10, wherein the second MCS is used for the MU-MIMO transmit mode based at least in part on a rate mapping between the SU transmit mode and the MU-MIMO transmit mode.

16. The computer-readable medium of claim 10, wherein a maximum MCS for the MU-MIMO transmit mode is based at least in part on a number of users associated with the MU-MIMO transmit mode.

17. The computer-readable medium of claim 15, wherein the rate mapping is based at least in part on a rate mapping function comprising time boundary values, the process executed by the wireless communication device further comprising:
updating the rate mapping by adjusting the time boundary values of the rate mapping.

18. The computer-readable medium of claim 17, wherein the process executed by the wireless communication device further comprises:
determining if the rate mapping is to be updated after an interval of time that is adapted based at least in part on channel conditions.

19. A wireless communication device for providing rate adaptation in a multi-user wireless communication system, the wireless communication device comprising:
a rate control block to operate at a single user (SU) transmit mode of the wireless communication device, wherein the SU transmit mode uses a first modulation and coding scheme (MCS), and switch to a multi-user multiple input multiple output (MU-MIMO) transmit mode of the wireless communication device, wherein a second MCS is used for the MU-MIMO transmit mode based at least in part on the first MCS, the second MCS being less than the first MCS.

20. The wireless communication device of claim 19, wherein the second MCS is further used for the MU-MIMO transmit mode based at least in part on an age of a most recent channel state information (CSI).

21. The wireless communication device of claim 20, wherein the second MCS used for the MU-MIMO transmit mode is decremented from the MCS for the SU transmit mode by a number of steps, and wherein the number of steps is based at least in part on a predefined window of time associated with the age of the most recent CSI.

22. The wireless communication device of claim 21, wherein different predefined windows of time are defined for MU-MIMO transmit modes associated with different numbers of users.

23. The wireless communication device of claim 19, wherein the rate control block is further to:
update the MCS for the SU transmit mode based at least in part on an error rate for the SU transmit mode.

24. The wireless communication device of claim 19, wherein the second MCS is used for the MU-MIMO transmit mode based at least in part on a rate mapping between the SU transmit mode and the MU-MIMO transmit mode.

25. The wireless communication device of claim 24, wherein the rate mapping is based at least in part on a rate mapping function comprising time boundary values, and wherein the rate control block is further to:
update the rate mapping by adjusting the time boundary values of the rate mapping function.

26. The wireless communication device of claim 25, wherein the rate control block is further to:
determine if the rate mapping is to be updated after an interval of time that is adapted based at least in part on channel conditions.

27. The wireless communication device of claim 19, wherein a maximum MCS for the MU-MIMO transmit mode is based at least in part on a number of users associated with the MU-MIMO transmit mode.

28. A wireless communication device, comprising:
means for operating at a single-user (SU) transmit mode of the wireless communication device, wherein the SU transmit mode uses a first modulation and coding scheme (MCS); and
means for switching to a multi-user multiple input multiple output (MU-MIMO) transmit mode of the wireless communication device, wherein a second MCS is used for the MU-MIMO transmit mode based at least in part on the first MCS, the second MCS being less than the first MCS.

29. The wireless communication device of claim 28, wherein the second MCS is further used for the MU-MIMO transmit mode based at least in part on an age of a most recent channel state information (CSI).

30. The wireless communication device of claim 28, wherein the second MCS is further used for the MU-MIMO transmit mode based at least in part on a rate mapping between the SU transmit mode and the MU-MIMO transmit mode.

* * * * *